(12) United States Patent
Mills

(10) Patent No.: US 7,278,217 B1
(45) Date of Patent: Oct. 9, 2007

(54) TRIGONOMETRIC TEACHING AID

(76) Inventor: John A. Mills, 4269 Gilead Shores Rd., Blounts Creek, NC (US) 27814

( * ) Notice: Subject to any disclaimer, the term of this patent is extended or adjusted under 35 U.S.C. 154(b) by 0 days.

(21) Appl. No.: 11/309,738

(22) Filed: Sep. 20, 2006

(51) Int. Cl.
*B43L 7/10* (2006.01)
(52) U.S. Cl. .............................. 33/276; 33/471; 33/424
(58) Field of Classification Search .......... 33/276–280, 33/421–422, 424–425, 453, 459, 463–464, 33/471–472; 434/211
See application file for complete search history.

(56) References Cited

U.S. PATENT DOCUMENTS

| | | | |
|---|---|---|---|
| 662,977 A * | 12/1900 | Schmelz | 33/453 |
| 819,591 A * | 5/1906 | Peroy | 33/278 |
| 1,894,886 A * | 1/1933 | Paskowski | 33/453 |
| 2,239,229 A * | 4/1941 | Harris | 33/453 |
| 2,460,713 A * | 2/1949 | Richardson | 33/453 |
| 5,632,094 A | 5/1997 | Mills | 33/432 |
| 7,188,427 B2 * | 3/2007 | Johnson | 33/471 |
| 2005/0166411 A1 * | 8/2005 | Scorvo | 33/471 |

* cited by examiner

*Primary Examiner*—Yaritza Guadalupe-McCall
(74) *Attorney, Agent, or Firm*—Ishman Law Firm P.C.

(57) ABSTRACT

A trigonometric teaching aid for providing students with real life applications for the principles of trigonometry includes a transit assembly having a sight tube with cross hairs, a level and an upper protractor pivotally connected to an upper end of a vertical scale, and a base assembly including a lower protractor pivotally connected to a lower end of the scale member. By leveling the transit assembly and measuring the angles of inclinations at the protractors, student using trigonometric formulas, tables and classroom lessons can determine physical measurements of real life objects.

7 Claims, 4 Drawing Sheets

7,278,217 B1

TRIGONOMETRIC TEACHING AID

FIELD OF THE INVENTION

The present invention relates to teaching devices and, in particular, to a teaching aid for assisting students in applying trigonometric lessons in real life applications.

BACKGROUND OF THE INVENTION

In teaching young students, particularly those of advanced stature as early as elementary school, Applicant has found that the thirst and assimilation of classroom knowledge is enhanced by providing the opportunity to apply the lessons in ways related to daily experiences and observations. For instance, in U.S. Pat. No. 5,632,094 entitled "Articulated Drafting Device for Drawing Perspectives", Applicant provides a drafting aid that enables students to create realistic dimensional drawings of shapes and objects, thereby increasing their knowledge of geometric principles through hands-on experience. It would be desirable to afford similar benefits to students in the field of trigonometry.

SUMMARY OF THE INVENTION

The present invention provides a teaching aid for assisting students, particularly young children, in applying trigonometric classroom lessons in real life applications. The teaching aid consists of a transit and upper protractor that are pivotally mounted at the top of a support member. A lower protractor is pivotally mounted at the bottom of the support member. A level is provided for establishing a horizontal orientation of the transit at the measurement site. For determining dimensions of viewed objects, the student determines by available means, such as scales or steps, the distance from the viewed object, and the angles between the top and bottom of the viewed object. Then applying the proper trigonometric formulae, the student can determine the height. By also employing the lower protractor, the student may also determine relationships from elevations or slopes.

Accordingly, it is an object of the present invention to provide a teaching aid for enhancing trigonometric knowledge.

Another object is to provide a teaching apparatus allowing a student to determine physical aspects of structures using trigonometric lessons.

A further object is to provide a simple viewing device enabling students to use trigonometric teachings in real life applications.

BRIEF DESCRIPTION OF THE DRAWINGS

The above and other features of the invention will become apparent upon reading the following description taken in conjunction with the accompanying drawing in which.

DETAILED DESCRIPTION OF THE PREFERRED EMBODIMENT

Figure 1:
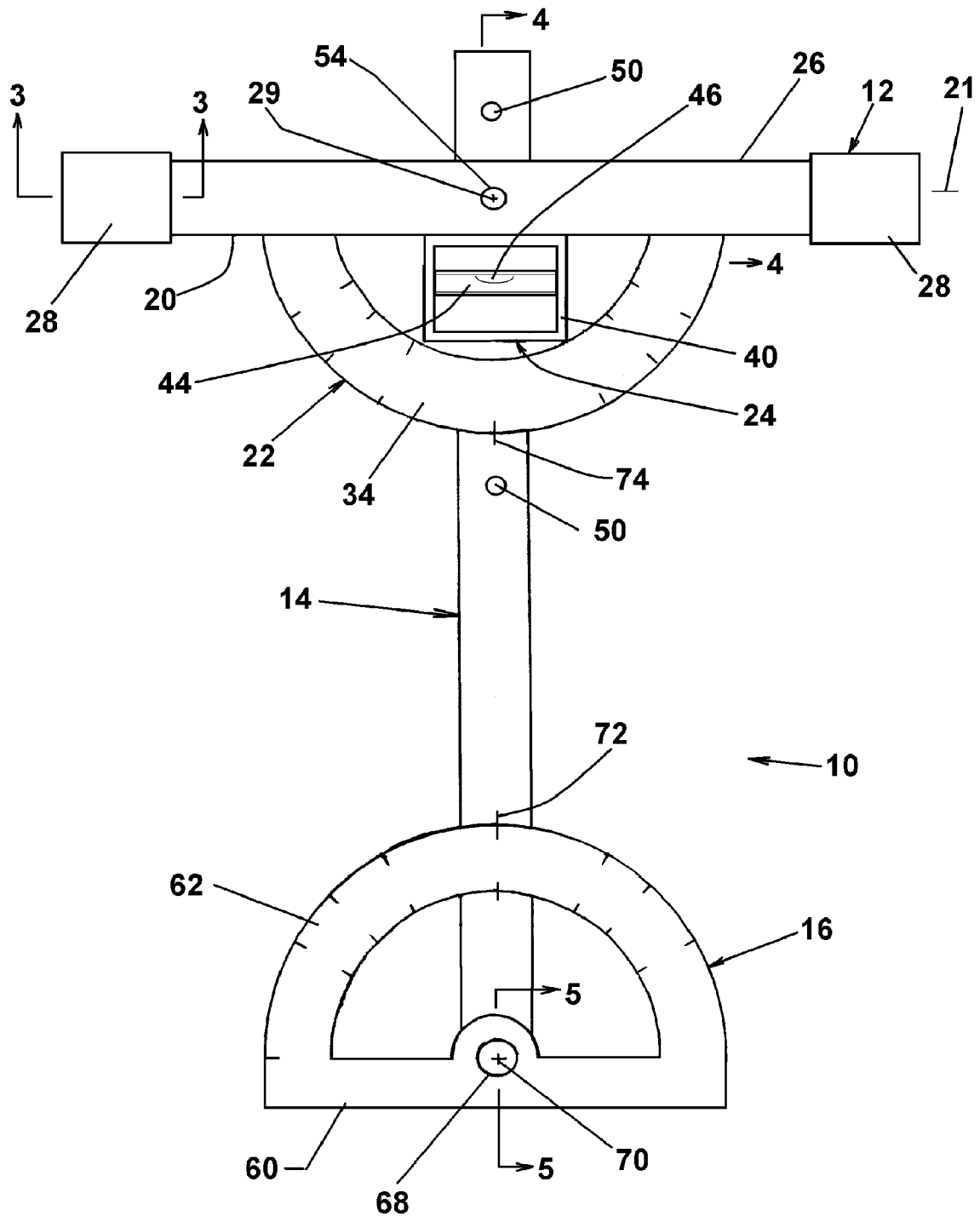
FIG. 1 is a front view of a trigonometric teaching aid in accordance with an embodiment of the invention.
Figure 2:
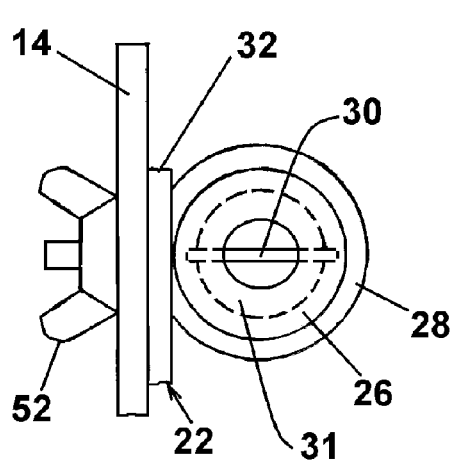
FIG. 2 is an upper end view of the sight tube of the teaching aid shown in FIG. 1.
Figure 3:
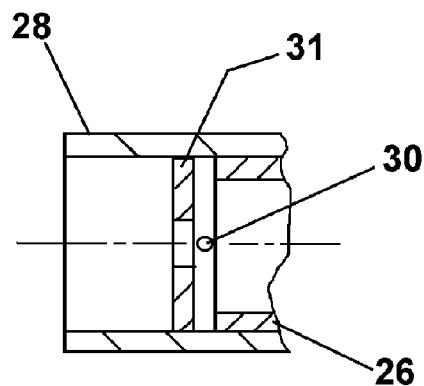
FIG. 3 is a cross sectional view taken along line 3-3 in FIG. 1.
Figure 4:
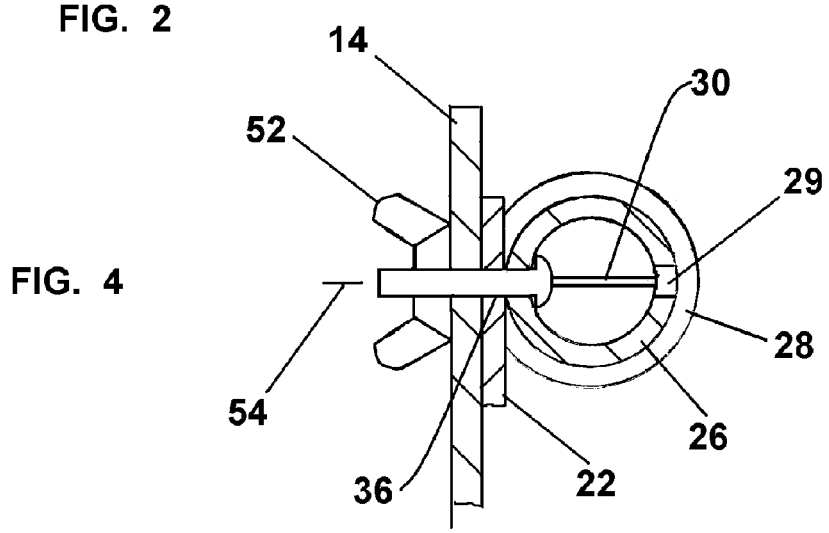
FIG. 4 is a cross sectional view taken along line 4-4 in FIG. 1.
Figure 5:
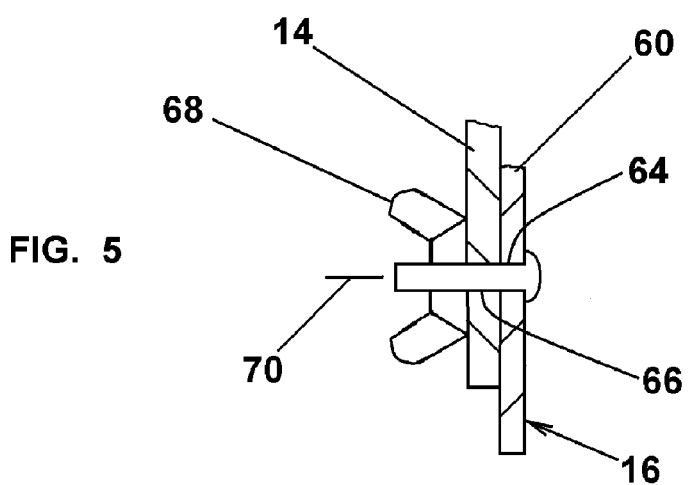
FIG. 5 is a cross sectional view taken along line 5-5 in FIG. 1.

Referring to the drawing for the purposes of describing the preferred embodiment and not for limiting same, FIG. 1 illustrates a trigonometric teaching aid 10 for providing students with real life applications for the principles of trigonometry.

The teaching aid 10 comprises a transit assembly 12 pivotally connected to the upper end of a support member 14, such as a ruler or yardstick, having a lower protractor 16 pivotally connected thereto at a lower end.

Referring additionally to FIGS. 2-5, the transit assembly 12 comprises a cylindrical sight tube 20 with an axis 21, an upper protractor 22, and a level assembly 24. The sight tube 20 includes a cylindrical center sleeve 26 having end collars 28 telescopically received at the ends thereof and mechanically or adhesively attached thereto. For purposes of description, the transit assembly 12 is viewed from the left in FIG. 1. The sleeve 26 includes a transverse through hole 29 at the center thereof. A single horizontal cross hair or bar 30, in the form of a thin tubular or planar member, is diametrically attached at the end face at each end of the sleeve 26. The left sight end collar additionally includes an annular washer 31 for assisting alignment of the cross hairs at a viewing location.

The upper protractor 22 is of conventional planar design having a diametral base 32 and a semicircular graduated sector 34. A through hole 36 is formed at the protractor origin on the base 32. The base 32 is adhesively or mechanically attached to the sleeve 26 parallel to the sleeve axis 21, with the holes 29, 36 coaxial. The level assembly 24 includes a rectangular frame 40 having a center opening and carrying a cylindrical level 44 aligned in the opening parallel to the top edge of the frame 40. Accordingly, when the bubble 46 of the level is centered the axis of the transit assembly 12 lies in a horizontal plane.

The upper end of the support member 14 includes a plurality of vertically aligned holes 50 for enabling varying vertical positioning of the transit assembly better viewing of objects to be measured. The support ruler 14 is an elongated rectangular member, and preferably has a graduated scale imprinted on the reverse side to further aid in measurements. The transit assembly 12 is pivotally attached to the support ruler at one of the holes by a wing nut fastener assembly 52 inserted through the aligned holes 29, 36 for rotation about a transverse axis 54.

The lower protractor 16 is also of conventional design having a diametral base 60 and a semicircular graduated sector 62. An enlarged through hole 64 is formed at the protractor origin on the base 60. A through hole 66 is formed in the lower end of the support member 14. The lower protractor 16 is pivotally connected to the support member ruler 14 by a wing nut fastener assembly 68 inserted through the aligned holes 64, 66 for rotation about a transverse axis 70. The support ruler 14 includes line indicia 72, 74 adjacent the sectors of the protractors 16, 22 respectively, for enabling reading of adjusted angular positions as described below.

The sectors of the protractors are provided with customary angular graduations, generally in one degree increments, at the outer and inner sector edges. The graduations may be conventionally inscribed ranging from 0° to 180°. Alternatively, the 0° degree mark may be centered enabling direct measurement of inclinations therefrom.

The teaching aid 10 may be used in indoor and outdoor settings. Use of the teaching aid is preferably in conjunction with trigonometric formulas tables in a booklet form. For simple determination of vertical height of an object from a level location, the distance to the object is measured using available means such as a tape measure, yard stick, paces or the like. Next the support member 14 is centered at a right angle to the lower protractor 16, and the transit assembly 12 leveled. Thereafter, the transit assembly 12 is rotated to align the top of the object with the cross hairs and the angle of upward inclination recorded. Then, the transit assembly is rotated to the base of the object and the downward inclination similarly determined and recorded. Using learned trigonometric functions, the student can employ the tables to sum the determined vertical heights for each measured angle to find the overall vertical height of the object. The elevation of the transit will also be determined.

Figure 6:
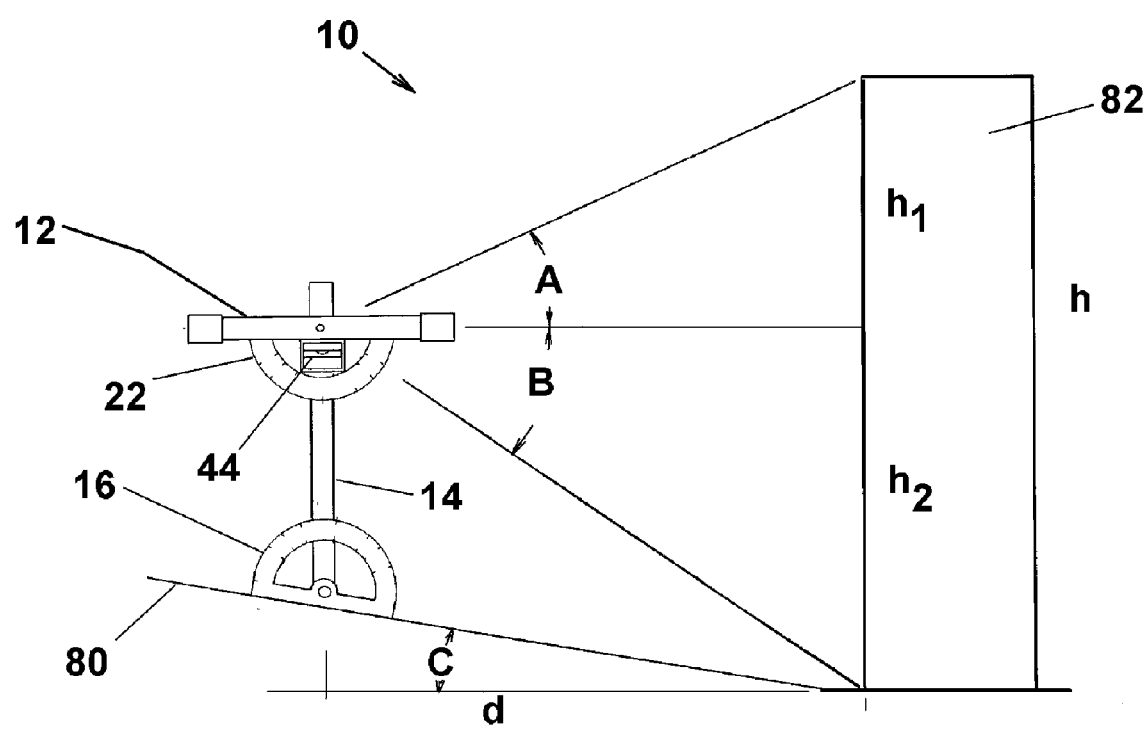
FIG. 6 is an elevational view illustrating an application of the teaching aid.

A more complex determination is illustrated in FIG. 6, wherein the teaching aid is disposed on a slope 80 with an inclination angle "C" and it is desired to determine the height of a building 82. Measurement of the distance from the teaching aid 10 to the building 82 along the slope is possible and determined. With the upper protractor 22 centered on the support ruler 14, the lower protractor 16 is pivoted until the transit is level. Thereafter the angle "A" to the top of the building and the angle "B' to base of the building are determined. From angle "C' and the slope distance, the horizontal distance "d" to the building can be determined. From the angles "A" and "B' and the horizontal distance, the height "h" can be determined as the sum of "$h_1$" and "$h_2$" in accordance with the prior example.

Figure 7:
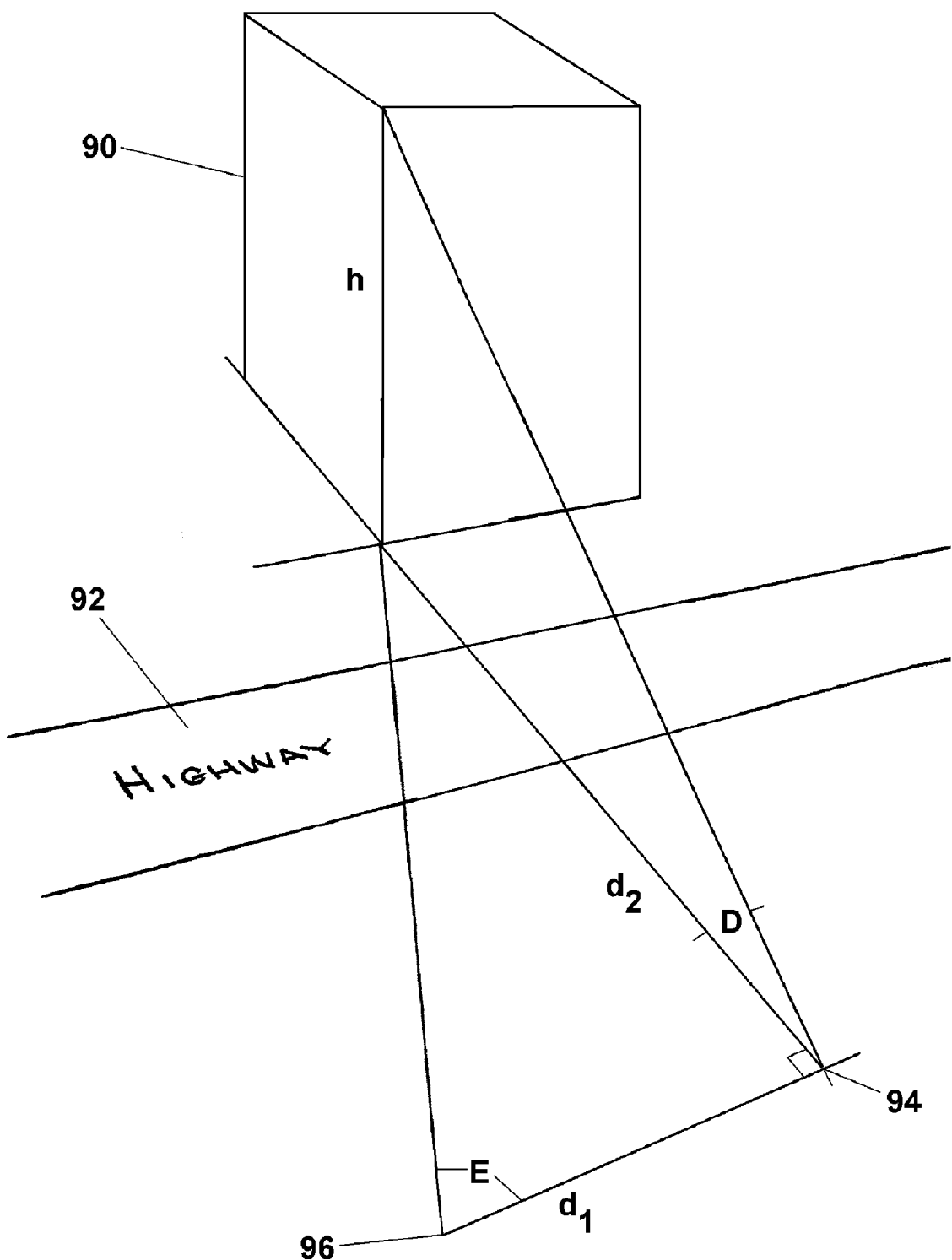
FIG. 7 is a perspective view illustrating another application of the teaching aid.

The height of an object may also be determined with the teaching aid where direct measurement to the object is not possible, for instance as shown in FIG. 7 wherein the building 90 is separated from the view location by a highway 92 or other barrier. Therein, an initial location 94 is selected and marked. Following the above procedures, the angle "D" between the top on bottom determined and recorded, as a single or plural angle as in the prior example. Thereafter, the transit assembly 12 is placed horizontally at the marker location 94 with the support member 12 aligned with the base corner of the building and the transit assembly centered. Using the transit assembly, a second distant location 96 on the line of sight and at right angles to the building is marked and the distance "$d_1$" between marker locations 94, 96 measured. Thereafter with the teaching aid horizontal and the support ruler aligned on the base, the angle "E" to the base corner of the building 90 determined and recorded. It will be appreciated, that the distance "$d_1$" and angle "E' allow the distance $d_2$ from the first marker to the building to be determined and therefrom, the height "h" of the building. If desired, the width of the building can be determined by making an angular determination to the other corner with the teaching aid in the horizontal position.

The teaching aid may also be provided in simpler formats. For instance, only a single protractor, at either the top or bottom, may be used. This may result in inclinations of the support ruler in certain situations and a more complicated determination of angles, but nonetheless enable measurements and calculations of the types disclosed above. Further, where only slopes, such as roof slopes or other grades desire to be determined, the level assembly may be substituted for the transit assembly.

It will thus be appreciated that the teaching aid may be used in making measurements, indoors and outdoors, to enable the students to determine physical characteristics of common real life objects using classroom trigonometry lessons, and create scales drawings based thereon thereby adding interest to an otherwise text based experience.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed is:

1. A trigonometric teaching aid for providing students with real life applications for the principles of trigonometry comprising: an elongated rectangular planar support member; a first protractor having a straight diametral base and a semicircular sector with an origin; a first adjustable fastener pivotally connecting said first protractor at said origin thereof to an upper end of said support member for rotation about a first transverse axis; a sight tube connected to and aligned with said base of said first protractor and having a longitudinal axis normal to said first transverse axis; a cross hair member attached at each end of said sight tube parallel to said first transverse axis; a level member carried with said sight tube and having means for indicating when said sight tube is horizontally positioned; scaling graduations on said semicircular sector of said first protractor to denote the angle of inclination of said sight tube relative to said support member; a second protractor having a straight diametral base and a semicircular sector with an origin; a second adjustable fastener pivotally connecting said second protractor at said origin thereof to a lower end of said support member for rotation about a second transverse axis; and scaling graduations on said semicircular sector of said second protractor to denote the angle of inclination of said sight tube relative to said support member whereby the angles of inclinations may be used in conjunction with trigonometric tables to determine physical measurements of objects being viewed.

2. The teaching aid as recited in claim 1 including cylindrical end caps at each end of said sight tube and overlying and protecting said cross hair member.

3. The teaching aid as recited in claim 2 wherein said level is mounted on a rectangular frame connected to the sight tube.

4. The teaching aid as recited in claim 3 wherein said adjustable fasteners comprise threaded shanks and wing nuts.

5. The teaching aid as recited in claim 4 wherein said support member includes a plurality of apertures for selectively attaching said protractors with said fasteners.

6. A trigonometric teaching aid for applying trigonometry lessons to objects being viewed comprising: an elongated support member pivotally connected at an upper end to an upper protractor and pivotally connected at a lower end to a lower protractor, a hollow sight tube connected to upper protractor; a leveling device connected to said sight tube indicating when said sight tube is horizontal; scaling indicia between said protractors and said support member indicating angles of inclination therebetween; whereby the angles of inclinations may be used in conjunction with trigonometric tables to determine physical measurements of objects being viewed.

7. A trigonometric teaching aid for providing students with real life applications for the principles of trigonometry comprising: an elongated support member; a protractor having a straight diametral base and a semicircular sector with an origin; first pivot member pivotally connecting said protractor at said origin to an upper end of said support member for rotation about a first transverse axis; a sight tube connected to and aligned with said base of said first protractor and having a longitudinal axis normal to said first transverse axis; a cross hair member attached at each end of said sight tube parallel to said first transverse axis; a level member carried with said sight tube and having means for indicating when said sight tube is horizontally positioned; scaling graduations on said semicircular sector of said protractor to denote the angle of inclination of said sight tube relative to said support member; and a base member pivotally connected to a lower end of said support member for rotation about a second transverse axis.

* * * * *